Oct. 11, 1932.  B. P. HOLZBERG  1,882,496
FASTENER
Filed Nov. 8, 1930  2 Sheets-Sheet 1

Inventor
B. P. Holzberg
Attorney

Oct. 11, 1932. B. P. HOLZBERG 1,882,496
FASTENER
Filed Nov. 8, 1930 2 Sheets-Sheet 2
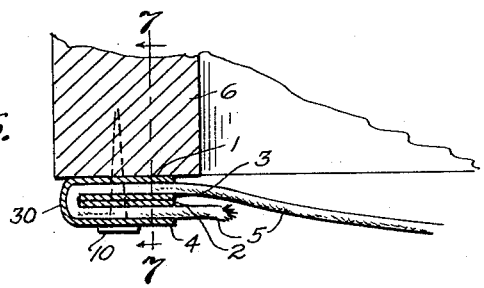
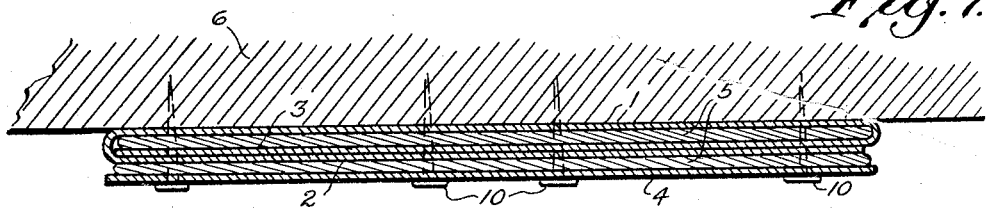
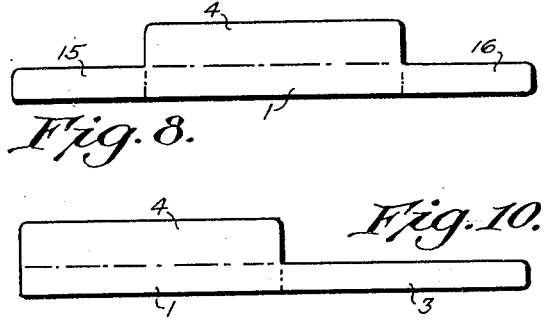
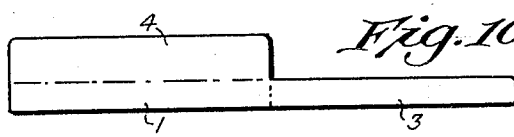
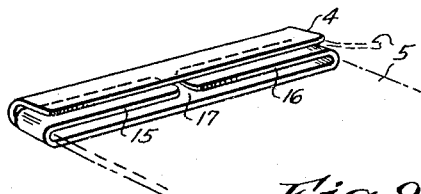
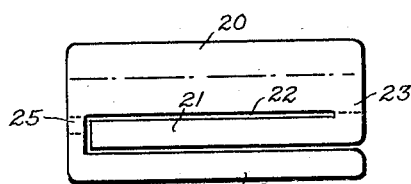
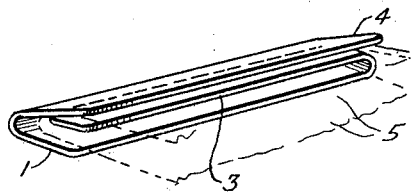
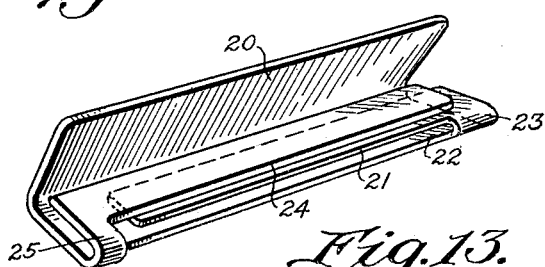
Inventor
B. P. Holzberg
Attorney Patented Oct. 11, 1932

1,882,496

UNITED STATES PATENT OFFICE

BAREND P. HOLZBERG, OF WASHINGTON, DISTRICT OF COLUMBIA

FASTENER

Application filed November 8, 1930. Serial No. 494,416.

This invention relates to fasteners and more particularly to fasteners used to secure the ends of webbing used in upholstering, and has for its object to provide a device of this character which is simple in construction, efficient in use, and less costly to manufacture than those heretofore proposed.

Another object of this invention is to provide a fastener for the ends of the spring-supporting webbing on upholstered furniture or similar material which must withstand tension or sustain weight, the construction of the fastener being such that it may be manufactured in large quantities and of relatively light weight malleable metal. In any event the fastener should be of sufficient strength to equalize the distribution of the longitudinal strains of the material being held over the whole width of said material.

Broadly the invention resides in the provision of a substantially rectangular main body portion with an attached extension which is adapted to be folded over a portion, and be brought within the confines of said main body portion, which latter is then bent to secure the end of the webbing in a fold containing said extension, the whole fastener to be secured to the frame of the furniture or other support.

Referring to the accompanying drawings forming a part of this specification and in which like numerals designate like parts in all the views,—

Fig. 6 is a transverse sectional view through a fastener such as shown in Figs. 1 to 5, said view being taken as on line 6—6 of Fig. 1 and looking in the direction of the arrows;

Fig. 7 is a longitudinal sectional view of the fastener taken as on line 7—7 of Fig. 6 and looking in the direction of the arrows;

Fig. 8 shows a fastener constituting a modified form of the invention;

Fig. 9 is a perspective view illustrating the complete folding of the fastener shown in Fig. 8;

Figure 1:
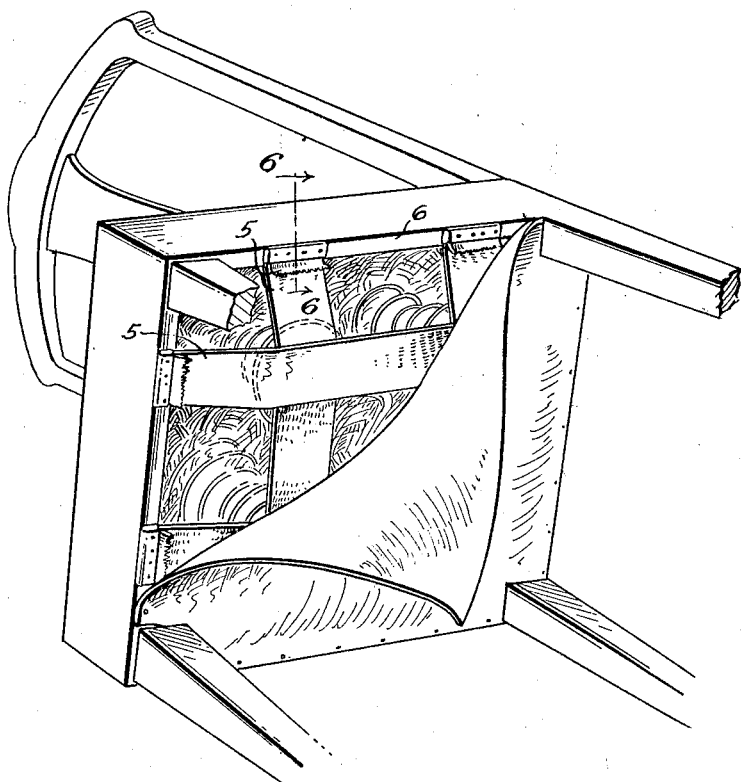
Fig. 1 is a perspective view of the bottom of a chair to which this invention has been applied.

Figs. 10 and 12 are views similar to Fig. 8 and showing further modifications of fastener constructions; and Figs. 11 and 13 are perspective views illustrating the complete folding of the fasteners illustrated respectively in Figs. 10 and 12.

Referring to Figs. 1 to 7 it will be seen that this fastener comprises a main body portion generally indicated by the numeral 1 which is of substantially rectangular shape, provided at each of its ends with an extension or tongue indicated at 2 and 3 which are in alignment with each other, which have a width slightly less than the width of the main body portion 1, and which are of a length each equal substantially to the length of said main body portion. Thus it will be seen that the main body portion is left with a rectangular lateral section 4 disposed to one side of but intermediate the extensions 2 and 3.

In application the fastener is placed between the end of the webbing 5 and the bottom of the side rail 6 of a chair for example, after which one of the tongues such as 2 is bent over its line of juncture with the main body portion, and pressed down upon the webbing. Then the other tongue 3 is similarly bent and pressed down on top of the tongue 2, see Figure 4, after which the section 4 of the fastener, together with the extreme end of the webbing 5, is bent over the folded tongues. The entire fastener and webbing are firmly secured to the rail 6 of the chair as by the usual upholstering nails 10 passed through perforations 11 formed in the metal of the fastener. Preferably, but not necessarily, these perforations are pre-punched at definite locations not only in the tongues but in the main body portion so that when the fastener is completely folded as above described, the perforations will be in substantial registry. Due to the soft and malleable nature of the metal from which these fasteners are made, it is possible to drive the nails 10 through the complete folded structure, but by having the perforations a neater job may result. The main body portion, or the first folded tongue, or both may be temporarily secured to the chair rail by a nail or the like as desired.

The modification shown in Figures 8 and 9 has incorporated the same basic principle the only difference being that the previously described tongues are made substantially half as long. In other words the tongues 15 and 16 are similarly placed but are shortened so that when they are bent over the line of juncture with the main body portion, their extreme ends will substantially meet as indicated at 17 in Figure 9.

Figure 2:
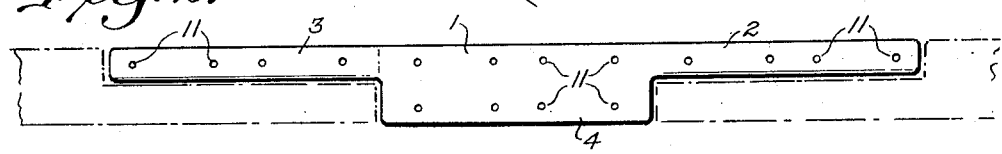
Fig. 2 is a view illustrating how a plurality of fasteners may be economically provided from a sheet of metal.
Figure 3:
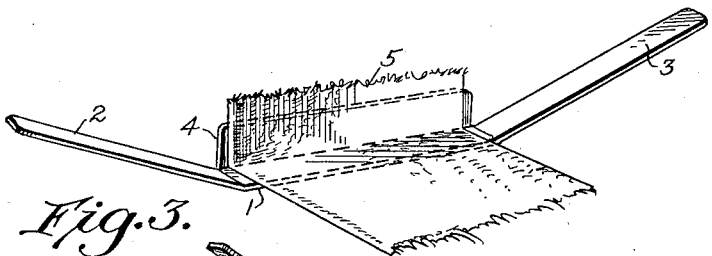
Fig. 3 illustrates the first step in securing the fastener to the end of a piece of webbing.
Figure 4:
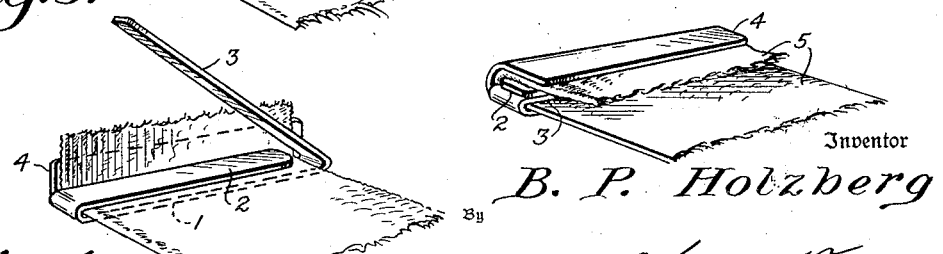
Fig. 4 illustrates a following step in securing the fastener to said webbing.
Figure 5:
Fig. 5 illustrates the completely formed fastening of the parts shown in Figs. 3 and 4.

The modification shown in Figures 10 and 11 illustrates a form of construction which is the same as that shown in Figure 2 except that one of the tongues has been omitted. In other words this fastener has only the single tongue 3.

The modification shown in Figures 12 and 13 illustrates a form of fastener wherein the tongues, instead of being formed in prolongation of the main body portion as hereinbefore stated, are parallelly and adjacently formed along one longitudinal side of said body portion. That is to say the main body portion 20 is provided with a tongue 21 parallel thereto and spaced therefrom by the cutting die to provide a slotway 22, one end of said tongue being joined as at 23 to one end of the main body portion with the free end of said tongue extending not quite to the opposite end of the main body portion. There is provided a second tongue 24 likewise parallel to the main body portion and lying adjacent the tongue 21, one end of the tongue 24 joined as at 25 to the main body portion with its other free end substantially coextensive with the opposite end of said body portion, all as will be clear from Figure 12. The two tongues are separated from each other by the cutting die but left joined to the main body portion for folding thereover. In applying this modified fastener, the end of the webbing is passed through the slotway 22 after which the tongue 21 is bent laterally to overlie the upper surface of the webbing as well as the main body portion. Then the other tongue 24 is likewise laterally bent over the tongue 21 and pressed down thereon. Lastly the edge of the main body portion, opposite to that to which the tongues are secured, is bent over and pressed down upon the uppermost tongue 24 carrying with it the end of the webbing which is thereby folded over the two tongues 21 and 24, after which the entire fastener is secured to the rail of the chair or other support.

By this construction it will be seen that there is provided a fastener provided with means which, when secured in place, will receive all of the longitudinal strains placed upon the webbing and distribute said strains along a transverse element of the webbing. Heretofore, webbing has merely been tacked in place, the tacks taking none of the longitudinal strain of the webbing which is therefore transferred through friction to the transverse threads of the webbing which latter in turn are held in place by the tacks. The tongues are preferably made of a width slightly less than half the width of the main body portion so that the section 4 may have sufficient material to form the enlarged fold indicated at 30 in Figure 6, with ultimate registration of the opposite long side edges of the main body portion. On the other hand, if the material being secured has no appreciable thickness, the tongues may be substantially half the width of the main body portion.

It is obvious that those skilled in the art may vary the details of construction as well as arrangements of parts without departing from the spirit of the invention and therefore it is not desired to be limited to the foregoing except as may be required by the claims.

What is claimed is:

1. The combination with a piece of upholstery webbing or the like, of a fastener comprising a bendable metal plate through which tacks or the like may be driven, said plate having a tongue at one edge folded down upon and across the webbing, the end of the webbing being folded down over the tongue, forming a loop within which the tongue extends to sustain pull on the webbing and the plate having a rear portion bent down upon the end of the webbing and clamping the same around the tongue.

2. The combination with a piece of upholstery webbing or the like, of a fastener comprising a bendable metal plate through which tacks or the like may be driven, said plate having tongues at opposite edges folded down upon and across the webbing, the end of the webbing being folded down over the tongues, forming a loop within which the tongues extend to sustain pull on the webbing, and the plate having a rear portion bent down upon the end of the webbing and clamping the same around the tongues.

3. The combination with a piece of upholstery webbing or the like, of a fastener comprising a bendable metal plate, said plate having tongues at the opposite ends of one edge thereof, said tongues being folded down upon and across webbing resting on the plate, the end of the webbing being folded down over the tongues, forming a loop within which the tongues extend to sustain pull on the webbing, and the plate having a rear portion bent down upon the end of the webbing and clamping the same around the tongues.

In testimony whereof I affix my signature.

BAREND P. HOLZBERG.